July 4, 1939.  J. DAUBEN  2,165,033
CHASSIS OF MOTOR-DRIVEN VEHICLES
Filed Feb. 27, 1937  2 Sheets-Sheet 2
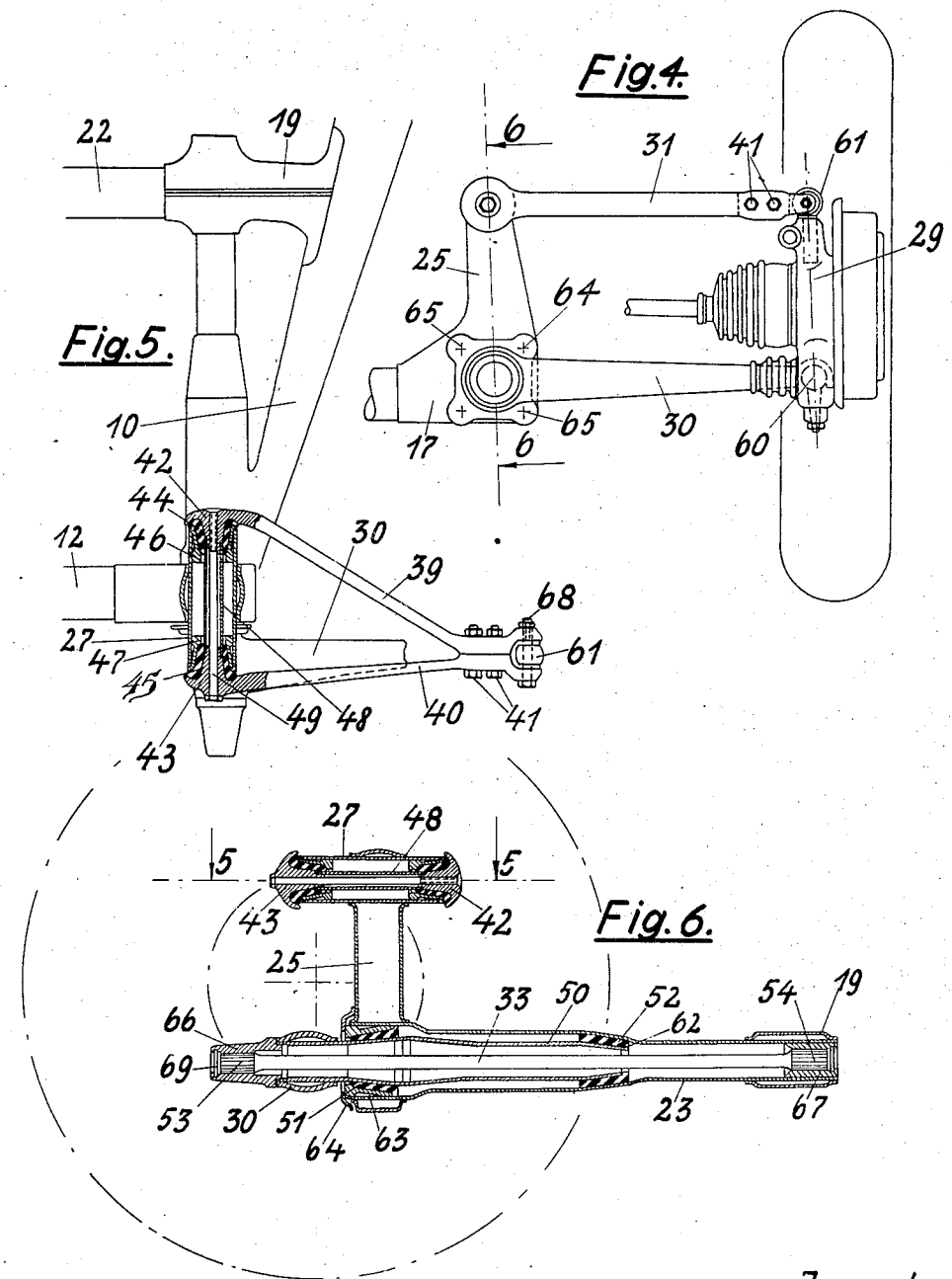
Inventor
Joseph Dauben.

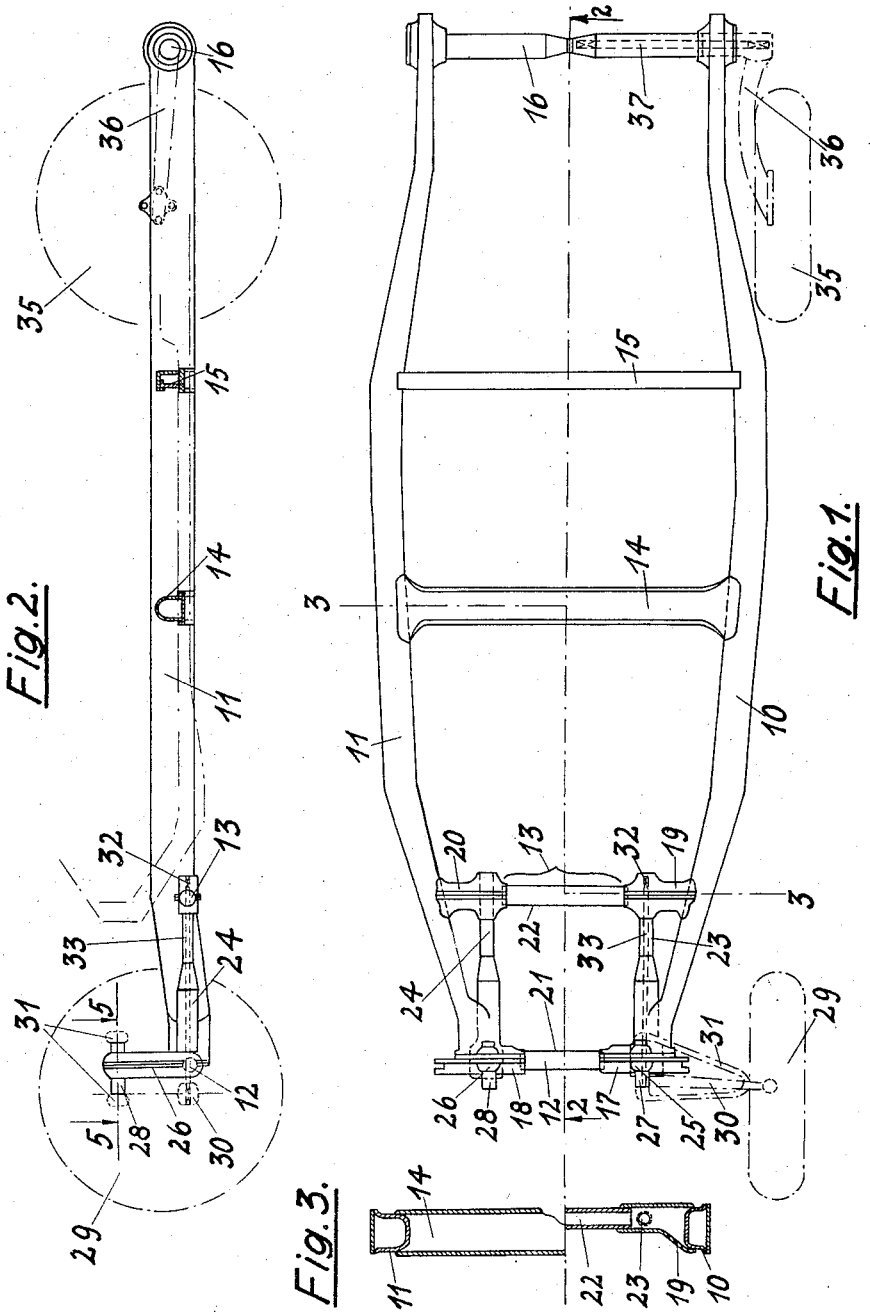

Patented July 4, 1939

2,165,033

UNITED STATES PATENT OFFICE 2,165,033

CHASSIS OF MOTOR-DRIVEN VEHICLES

Joseph Dauben, Stuttgart, Germany, assignor to Daimler-Benz Aktiengesellschaft, Stuttgart-Unterturkheim, Germany Application February 27, 1937, Serial No. 128,149
In Germany February 14, 1936

22 Claims. (Cl. 267—57)

My invention relates to the chassis of a motor-driven vehicle and, more particularly, to the frame structure and a wheel suspension in which the springs are formed by torsion rods extending longitudinally of the vehicle.

An object of my invention is to relieve the main beams of the frame from the torsional stress set up therein by the torsion rods and to reinforce the frame with a view to the prevention of oscillations of the frame, which are of frequent occurrence when the wheels are independently suspended.

Another object of my invention is to provide a rigid twist-proof frame structure which is capable of taking up all of the forces and torques imparted thereto from the wheels without being deformed by action of such forces.

A further object is an improvement in the hinge connection of wheel guiding links with the frame, whereby the rigidity of the structure is increased and its weight may be reduced.

Further objects of my invention will appear from the description of a preferred embodiment following hereinafter, and the features of novelty will be pointed out in the claims.

A preferred embodiment of my invention is illustrated in the accompanying drawings in which:

Fig. 1 is a plan view of the entire frame, the means for suspending a front wheel and a rear wheel being shown in dotted lines;

Fig. 2 is a section taken along line 2—2 of Fig. 1;

Fig. 3 is the section taken along the broken line 3—3 of Fig. 1;
Fig. 4 is an elevation of the front wheel suspension viewed from the left with regard to Figs. 1 and 2 on an enlarged scale;

Fig. 5 represents part of Fig. 1 on an enlarged scale, partly in section along line 5—5 of Figs. 2 and 6; and Fig. 6 is the section taken along line 6—6 of Fig. 4.

The frame of the vehicle may be regarded as composed of two longitudinal beam units which are interconnected by a number of transverse beams 12, 13, 14, 15 and 16, each unit respectively comprising a primary longitudinal beam 10 or 11, a secondary longitudinal beam 23 or 24, and a transverse beam 19 or 20. As the two units are alike, it is sufficient to describe one of them hereinafter.

The primary longitudinal beam is formed of a pressed channelled sheet metal beam closed by a strip of sheet metal welded thereon. Its box-shaped cross-section will appear from Fig. 3 showing that the beam tapers towards its ends. The front end partly embraces the secondary beam which is preferably of tubular form and diverges rearwardly at an acute angle. Fig. 6 shows a section through the beam 23 on an enlarged scale, and it will appear from this illustration that this member tapers towards the rear in two successive steps. Its rear end extends through bores of two flanged hollow sheet metal members which complement each other to form a hollow flat casing 19. This casing forms a transverse beam which surrounds the end of the beam 22 and forms a continuation thereof. The two sections of the casing 19 are welded together and to the longitudinal beam 10 and to the secondary beam 23 traversing it. Similarly, the front ends of the beams 10 and 23 are welded to one another, whereby a rigid triangular structure is formed.

Each of the ends of the transverse beam 12 is similarly formed by two flanged hollow sheet metal members 17, Figs. 1 and 4, having aligned openings through which the front end of the beam 23 extends and which embrace the end of the transverse beam 12. The two members 17 are welded to one another along their adjoining flanges and to the central section of the beam 12 and the beam 23. Upwardly projecting ends of these sheet metal members form a post 25 provided with aligned openings through which a horizontal longitudinal bushing 27 extends. The bushing 27 is welded to the post 25.

While the cross-section of the transverse beams 12, 22 and 16 is circular, the transverse beams 14 and 15 have a box-shaped cross-section.

All of the frame elements described hereinabove are rigidly united, preferably by welding, and thus form a very stiff frame structure.

The front wheels are independently suspended and, as the suspending means are alike for both front wheels, it will be sufficient to describe the suspending means associated with the frame structure 10, 19, 23 hereinafter. The wheel carrier 29 is connected by a ball joint 60 to a lower link 30 and by a swivel hinge 61 to an upper link 31 so as to be swingable about an upright axis for steering purposes. The two links 30, 31 extend transversely to the vehicle substantially parallel to each other and are hinged to the frame in the following manner.

The inner end of the lower link 30 embraces the outer end of a tubular member 50 and is rigidly attached thereto. The member 50 extends into the secondary beam 23, and is journalled therein for rotation about the axis thereof. The journals comprise preferably two rubber sleeves 51, 52.

The rubber sleeve 52 is interposed between the conical inner end of the member 50 and a tapering section of the beam 23, and its end of smaller diameter is provided with a flange 62 which engages over the end of the member 50 and is thus held in position.

The sleeve 51 is seated on a tapering section of the member 50 and is surrounded by a flanged metal bushing 63 which is inserted in the outer end of the secondary beam 23 and is held in place therein by a cap 64 bolted to the member 17 as indicated at 65. The rubber sleeve 51 is provided with a flange engaging the inner end face of the bushing 63, whereby the rubber sleeve is held in position.

The spring which counteracts relative up-and-down movement of the wheel carrier 29 and the frame is formed by a torsion rod 33 which is substantially co-extensive with the secondary beam 23 and is connected to the frame and to the lower link. Preferably, the torsion rod is arranged within the tubular beam 23 as shown in Fig. 6. Its outer end is rigidly connected to the lower link 30 and to the tubular pivot member 50 by suitable means such as a socket 66. This socket is splined on a head provided on the rod 33. The inner end of the rod 33 is formed with a head splined in a busing 67 which is inserted in the rear end of the beam 23 and suitably secured thereto, for instance by welding. Thus it will appear that any pivotal movement of the transverse link 30 will twist the rod 33 about its axis.

In assembling the parts, the elements 66, 50 and 30 are preferably first firmly connected, for instance by welding. Then, the cap 64 and the busing 63 are slipped over the tube 50. Their inner diameter just slightly exceeds the largest diameter of the tube. Then, the rubber sleeve 51 is slipped over the tube, as it can be passed over the thicker section thereof owing to its elasticity, until it slips into the space between the metal bushing 63 and the tapering section of the tube 50. The tube 50 is then introduced into the tubular beam 23 and held in place therein by the cap 64 which is bolted to the frame at 65. Finally, the torsion rod 33 is introduced through the socket 66 and held in place by a split ring 69 inserted in the mouth of the socket member 66.

The structure of the upper link will best appear from Fig. 5 which shows that the link is composed of two members 39 and 40. The outer ends thereof embrace the swivel hinge member 61, being pivoted thereto by a longitudinal horizontal pin 68 and are rigidly connected to one another by bolts 41. They diverge towards the frame and their inner ends straddle the bushing 27 and are formed with hub members 42 and 43 respectively. Each of these hub members has a conical portion inserted in the end of the bushing 27 and a cover portion integral therewith. Both hub members 42 and 43 have axial bores, the bore of the hub member 42 being tapped. Suitable means are provided to maintain the hub members in position within said bushing, for instance, means for connecting the hub members. These means may be in form of a tie rod 49 which extends through the bore of the member 43 and is screwed into the bore of member 42. The opposed inner ends of the hub members 42 and 43 engage a spacing sleeve 48 whereby the relative position of the hub members is accurately defined. Conical rubber inserts 44 and 45 are interposed between the bushing 27 and the hub members 42 and 43. Preferably, these rubber inserts have flanges engaging between the ends of the bushing 27 and the cover portions of the hub members to prevent direct contact thereof. In order to accurately position the rubber inserts within the bushing, each of them is respectively supported by metallic sleeves 46 and 47. These sleeves are snugly fitted in the bushing 27 and have outer flanges engaging over the ends thereof whereby they are kept in place. Preferably, each rubber insert is firmly united with the adjacent metallic sleeve and the adjacent hub member by vulcanization, so that the elements 47, 45, 43, 40 and 64, 44, 42, 39 constitute two members which may be readily inserted in the ends of the bushing 27 and then connected by the tie rod 49 and the bolts 41. Suitable means (not shown) are provided to prevent rotation of the sleeves 46, 47 in the bushing so that friction of metallic parts upon each other is entirely eliminated, the relative motion being taken up by the rubber inserts 44 and 45. The tie rod permits holding the rubber inserts under a certain pressure.

The described structure has the advantage that the pivotal connection between the frame and the links 31 is capable of taking up considerable forces, as the spacing sleeve 48 reinforces the connection of the two sections of the link forming a triangular structure of high rigidity therewith. At the same time, the frame element 27 to which the link 31 is thus pivoted is relieved of stresses since the two sections 39 and 40 of the link do not set up bending stresses therein independently, such stresses being partly taken up by the interconnecting spacing sleeve 48. The rubber inserts afford the link a certain resiliency in all directions. The spacing sleeve 48 connecting the two hub members prevents the inserts from being subjected to an undue axial pressure.

All of the forces exerted by the wheel suspension on the frame are directly taken up either at the front corners or at the rear corners of the square structure formed by the beams 12, 13, 23 and 24, whereby the primary longitudinal beams 10 and 11 of the frame are relieved to a large extent.

The rear wheels 35 may be supported by arms 36 having pivots journalled in the rear transverse beam 16. Their springs may be formed by torsion rods 37 having one end attached to the arm 36 and the other end to the central portion of the transverse beam 16.

While I have described my invention hereinabove with reference to a specific embodiment, I wish it to be clearly understood that it is capable of numerous modifications within the scope of the appended claims.

What I claim is:

1. In a vehicle, the combination comprising a primary longitudinal beam, a secondary longitudinal beam joined thereto and diverging therefrom at an acute angle, a transverse beam connecting the diverging end of said secondary beam to said primary beam, the said beams being welded together to constitute a rigid triangular frame structure, a wheel carrier, a pair of transverse links for guiding the same relatively to said frame structure for up-and-down movement, a torsion spring co-extensive with said secondary beam, means for attaching one end of said spring to said frame structure adjacent to said transverse beam, and means for connecting the other end of said spring to one of said links adjacent to the joint of said longitudinal beams.

2. In a vehicle, the combination comprising a frame composed of a pair of primary longitudinal beams, of a pair of secondary longitudinal beams intersecting said primary longitudinal beams at one end thereof, and of transverse beams intersecting said primary and secondary longitudinal beams, wheel carriers, links for guiding said wheel carriers and said frame for relative up-and-down movement, some of said links being pivotally mounted on said secondary longitudinal beams to be swingable about the axis thereof, and torsion springs co-extensive with said secondary longitudinal beams and attached to said frame and to said last-mentioned links.

3. In a vehicle, two units each comprising a primary longitudinal beam, a secondary longitudinal beam joined to the front end thereof and diverging therefrom rearwardly at an acute angle, a transverse beam connecting the rear end of said secondary beam to said primary beam, a bracket extending upwardly from the joint of said longitudinal beams, the said beams and said bracket being welded together to constitute a rigid triangular frame structure, a wheel carrier, a pair of transverse links one above the other for guiding said carrier relatively to said frame structure for up-and-down movement, means for pivoting the upper link to said bracket, means for pivoting the lower link to said secondary beam, a torsion spring co-extensive with said secondary beam, means for attaching one end of said rod to said frame structure adjacent to said transverse beam, and means for connecting the other end of said rod to said lower link adjacent to said joint, the two units being interconnected by a transverse beam extending between said joints and by another transverse beam forming extensions of said first-mentioned transverse beams.

4. In a vehicle, in combination, a frame including a primary longitudinal beam, a transverse beam rigidly connected therewith, a secondary longitudinal beam parallel to the longitudinal axis of said vehicle and rigidly interconnected with said primary longitudinal beam and said transverse beam, a wheel carrying member, at least one link pivotally attached at one end to said member and journaled at its other end to said frame, and rotary spring means, said spring positioned within said secondary beam, said spring means being attached at one end to one link and at its other end to said frame for resiliently supporting said member.

5. The combination according to claim 4 in which said rotary spring means is a torsion rod.

6. The combination according to claim 4 including means for rigidly interconnecting one end of said spring means to that end of said secondary beam interconnected with said transverse beam, whereby said spring means is rigidly attached to said frame.

7. In a vehicle, in combination, a frame including a pair of primary longitudinal beams, a plurality of transverse beams rigidly interconnecting said primary longitudinal beams, secondary longitudinal beams having their axes substantially parallel to the longitudinal axis of the vehicle and rigidly interconnecting at least two of said transverse beams, the connection at one end of said secondary beams with one of said transverse beams, being made at the intersection of the primary beams with said transverse beam, wheel carrying members, linkage means on each side of said frame, each pivotally attached at one end to one of said members and journaled at its other end to said frame, and rotary spring means positioned within said secondary beams, said spring means attached at one end to said linkage means and at their other ends to said frame for resiliently supporting said members.

8. The combination according to claim 7 in which said rotary spring means comprise torsion bars.

9. The combination according to claim 7 in which said rotary spring means are co-axial and substantially co-extensive with said secondary beams.

10. In a vehicle having a frame including a hollow tubular frame member, rotary spring means positioned within and co-axial with said hollow frame member, means for fixedly attaching one end of said rotary spring means to said hollow frame member, a secondary tubular member surrounding at least a portion of said rotary spring means, said secondary tubular member positioned within and co-axial with said hollow frame member, means for journaling said secondary tubular member within said hollow frame member and preventing relative longitudinal movement thereof, means for fixedly attaching the other end of said rotary spring means to one end of said secondary tubular member, a wheel for said vehicle, and linkage means pivotally connected at one end to said wheel and at its other end fixedly attached to said secondary tubular member.

11. The combination according to claim 10 in which the means for journaling said secondary tubular member within said hollow frame member comprises rubber sleeves interposed therebetween.

12. In combination, a relatively stationary frame member, a relatively movable two-arm link having hubs on the ends of said frame member, a main bushing rigidly attached to said frame member, flanged secondary rubber bushings inserted in each end of said main bushing in such a manner that their flanges cover the ends of said main bushing, a tie rod interconnecting the hubs and holding the same in said main bushing, and a reinforcing sleeve between said hubs in contact with said rubber bushing, and accurately defining their position relatively to another.

13. The combination according to claim in which said rotary spring means is a torsion c 14. In a vehicle, a wheel carrier, a pair of a frame, a wheel carrier, a pair of h links, one above the other, means for h links to said frame and to said carrier the same for relative up and down said frame including an upright post attached thereto, the upper of said links being forked and hinged to such diverging ends of the fork, and for hinging such diverging ends in opposite of hub members, one respectively at diverging end and inserted in opposite said bushing, a spacing and reinforcing tween said hub members, and means necting said hub members with with one another, whereby said member and said sleeve form a wheel supporting unit.

15. The combination according cluding inserts of resilient material hubs and said bushing.

16. The combination accord 2,165,033 cluding inserts of rubber between said hubs and said bushing, and means for rigidly attaching said inserts to said bushing.

17. In combination, a relatively stationary frame member, a device adapted to move relatively to said frame member, and means for hinging said device to said frame member, comprising an arm connected at one end to said device, a hub on the other end of said arm, a bushing on said frame member, a rubber bushing interposed between and rigidly attached to said first bushing and said hub, said hub and said rubber bushing having superposed flanged portions extending over the end of said first bushing, and means other than said rubber bushing for holding said hub within said first bushing.

18. In combination, a relatively stationary frame member, a device adapted to move relatively to said frame member, and means for hinging said device to said frame member, comprising a pair of arms attached together at one end, and at said end to said device, hubs on the other ends of said arms, a bushing on said frame member, a pair of rubber bushings respectively interposed between and rigidly attached to said first bushing and said hubs, and means passing through said bushings for rigidly interconnecting said hubs to form with said arms a rigidly structural supporting member for said device.

19. The combination according to claim 18 in which said last means comprises a spacing sleeve in said bushing intermediate said hubs and a tie-bolt for abutting said hubs against said spacing sleeve.

20. The combination according to claim 12 wherein said hubs are formed with flanges covering the flange on said rubber bushings, whereby said rubber flanges are protected from injurious dirt and atmospheric conditions.

21. The combination according to claim 12 including means for attaching said rubber bushings to said main bushings.

22. In a vehicle having a frame, a bushing on said frame, and a device adapted to move relatively to said frame, the combination of means for releasably and elastically mounting said device in said bushing, comprising an arm connected at one end to said device and having a hub on its other end, a rubber bushing surrounding and rigidly attached to said hub, a sleeve adapted to closely fit within said first bushing and surrounding and rigidly attached to said rubber bushing, means for preventing relative rotation between said sleeve and said bushing, and means for holding said entire means within said frame bushing.

JOSEPH DAUBEN.